UNITED STATES PATENT OFFICE.

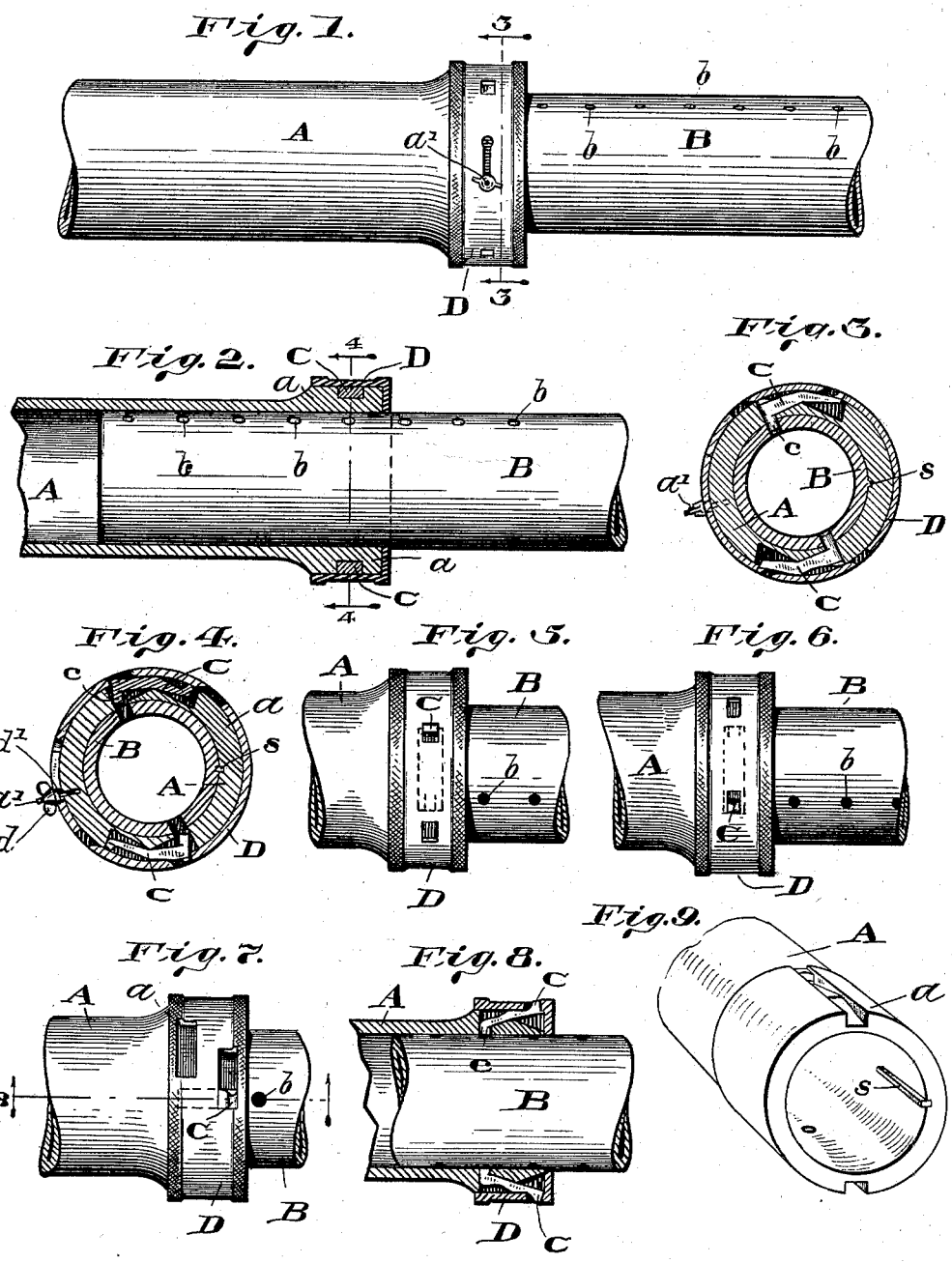

THOMAS W. McKENZIE, OF INDIANAPOLIS, INDIANA.

TELESCOPIC STRUCTURE.

SPECIFICATION forming part of Letters Patent No. 612,630, dated October 18, 1898.

Application filed March 1, 1898. Serial No. 672,156. (No model.)

*To all whom it may concern:*

Be it known that I, THOMAS W. MCKENZIE, a citizen of the United States, residing at Indianapolis, in the county of Marion and State of Indiana, have invented certain new and useful Improvements in Telescopic Structures, of which the following is a specification.

The object of my said invention is to provide a convenient and efficient means whereby the two members of a telescopic structure may be conveniently and efficiently locked in relation to each other at any point desired.

This invention is applicable to many uses;
but I have designed it especially for the seat-posts and steering-heads of bicycles, although I expect to use the same for any purpose to which it may be applicable.

Said invention will be first fully described, and the novel features thereof then pointed out in the claims.

The accompanying drawings illustrate that form of a telescopic structure composed of two cylindrical tubes, one slidably mounted in the other, said structure being provided with or embodying my present invention.

In said drawings, Figure 1 is a side elevation of the adjacent portions of two such telescopic tubes provided with attaching or locking means embodying my said invention; Fig. 2, a longitudinal vertical section through the outer tube, showing the inner tube in elevation; Fig. 3, a transverse sectional view on the dotted line 3 3, showing the device in its locked position; Fig. 4, a similar view on the dotted line 4 4, showing the device in its unlocked position; Fig. 5, an elevation or plan when the parts are in the position shown in Fig. 4; Fig. 6, a similar view when the parts are in the position shown in Fig. 3; Fig. 7, an elevation or plan of an alternative construction in which the dog or pawl is positioned longitudinally, instead of transversely or circumferentially, of the tubes; Fig. 8, a view on the dotted line 8 8 in Fig. 7, and Fig. 9 a perspective view of the head end of the outer tube when constructed as shown in Figs. 7 and 8.

In said drawings the portions marked A represent the outer member of the telescopic structure; B, the inner member; C, a dog or pawl pivoted in the outer member and adapted to engage with the inner member, and D a ring surrounding the end of the outer member.

The members A and B are adapted to move longitudinally in relation to each other, the member B being of appropriate size to fit within the member A. They are prevented from rotary movement in relation to each other by means of a spline $s$ in one which enters a groove in the other. The outer member A has an enlarged or thickened head $a$, within which a suitable recess or recesses are formed to receive the dogs or pawls C. I prefer to have two of these recesses and two dogs arranged diametrically opposite to each other, as shown in the drawings, although but one may be used where desired, and of course a greater number may be employed up to the limit of available space therefor.

The member B has a number of engaging points, as perforations $b$, in its surface arranged at such distances apart as may be desired to accommodate the various adjustments suitable to the purpose for which the structure is to be used. When the device is be employed in bicycles, these perforations may be approximately one-half inch apart, as usually adjustments of a half inch or thereabout are sufficient for this purpose. As will be observed by an inspection of the drawings, the recesses in the enlarged head $a$ of the outer member terminate at one end in a corresponding perforation.

The dogs C operate substantially in the manner of levers, the central portions of the recesses in the head portions $a$ of the outer members being raised, as shown in Figs. 3 and 4, and serving as fulcrums, upon which the under sides of said dogs rest at a middle point. At one end each of said dogs has a point $c$, which is adapted to pass through the perforation at the ends of corresponding recesses in the head $a$ of the outer member and into engagement with one of the perforations or engaging points of the inner member. When the dogs are in this position, the members A and B are locked in relation to each other, and any relative longitudinal movement is prevented. Said dogs have raised or wedge-shaped ends at the outsides thereof by which their positions are shifted, as will now be explained.

The ring D surrounds the head end $a$ of the outer member and has slots cut through its central portion or such recesses cut therein as to form interior cam-surfaces, which enable said ring to operate first upon one end and then upon the other of the dogs C, rocking said dogs over their central fulcrum or pivot-points and throwing them into or out of engagement, as will be readily understood upon an inspection of the drawings, especially Figs. 3 and 4, which show the two positions. Extending out from the head $a$ through a suitable slot in the ring D is a stud $a'$, which serves to limit the movement of said ring D. It is also desirable to provide means whereby said ring D may be locked at the end of its movement. A simple and effective means is to provide a thumb-nut $d$ to be carried by the stud $a'$ (which is screw-threaded for the purpose) and to form a small boss $d'$, which will sink into enlarged ends of the slot in the ring D. Thus, as will be readily seen, by unscrewing the thumb-nut $d$ until the boss is withdrawn from the enlarged end of the slot the ring will be free to move; but after it has been adjusted said ring can be securely locked in place by turning down said thumb-nut, forcing its boss $d'$ into the enlarged end of the slot.

Having thus fully described my said invention, what I claim as new, and desire to secure by Letters Patent, is—

1. In a telescopic structure, the combination of the inner member provided with a series of engaging points arranged at suitable distances apart longitudinally thereof, the outer member provided with recesses for pawls or dogs, said pawls or dogs mounted in said recesses and adapted to engage with said engaging points, and a surrounding ring adapted to be moved circumferentially of said structure and provided with cam-surfaces for operating said dogs, whereby said members may be shifted longitudinally relatively to each other and locked at any predetermined adjusted position.

2. The combination, in a telescopic structure, of the inner member B having perforations or notches $b$, the outer member having an enlarged head with recesses therein, the inner wall thereof being raised centrally to form a pivot or fulcrum, dogs or pawls mounted in said recesses and operating over said pivot or fulcrum and provided with ends adapted to engage with suitable engaging points in the inner member, and a surrounding ring extending over said dogs or pawls and having recesses formed in its interior side, the formation of the adjacent portions of said dogs or pawls and said ring being such that a cam relation exists between the two, whereby said dog or pawl may be operated by the rotation of said ring, substantially as set forth.

3. The combination, in a telescopic structure, of the inner and the outer telescopic members, dogs or pawls carried by one telescopic member and adapted to engage with the other, and a ring surrounding and adapted to operate said pawls, said several parts being constructed, arranged and operating substantially as set forth, whereby said inner and outer telescopic members may be adjusted longitudinally in relation to each other, and locked at any predetermined longitudinally-adjusted position.

4. The combination, in a telescopic structure, of the inner and outer telescopic members adapted to be adjusted longitudinally of each other, dogs or pawls mounted in the head on the outer member and adapted to engage with the inner member, a ring surrounding and adapted to operate the same, and a locking device whereby said ring may be locked to either position, whereby said inner and outer telescopic members may be adjusted longitudinally in relation to each other, and locked at any predetermined longitudinally-adjusted position, substantially as set forth.

5. The combination, in a telescopic structure, of an inner telescoping member, an outer telescoping member, a dog or pawl, mounted in one telescoping member and adapted to engage with the other telescoping member, and a surrounding ring movable circumferentially and adapted to operate said dog or pawl whereby said inner and outer telescoping members may be adjusted longitudinally in relation to each other, and locked at any predetermined adjusted position.

In witness whereof I have hereunto set my hand and seal, at Indianapolis, Indiana, this 26th day of February, A. D. 1898.

THOMAS W. McKENZIE. [L. S.]

Witnesses:
CHESTER BRADFORD,
JAMES A. WALSH.